US005980261A

United States Patent [19]

Mino et al.

[11] Patent Number: 5,980,261

[45] Date of Patent: Nov. 9, 1999

[54] KARAOKE SYSTEM HAVING HOST APPARATUS WITH CUSTOMER RECORDS

[75] Inventors: Hiroshi Mino, Hoya; Masao Toyosawa, Tokyo, both of Japan

[73] Assignee: Daiichi Kosho Co., Ltd., Japan

[21] Appl. No.: 08/864,333

[22] Filed: May 28, 1997

[30] Foreign Application Priority Data

May 28, 1996 [JP] Japan .................................... 8-133782

[51] Int. Cl.[6] ................................ G09B 5/00; G10H 1/26

[52] U.S. Cl. ................................ 434/307 A; 434/307 R; 84/610; 463/42; 455/4.2; 455/66; 348/7

[58] Field of Search ................................ 434/307 R–309, 434/318, 365; 84/477 R, 601–610, 622, 625, 630, 631, 634, 645, 650; 455/3.1, 4.2, 5.1, 6.3, 45, 66, 68, 86.1; 463/1, 24, 25, 29–42; 704/211, 258, 268, 270, 278; 381/2, 4, 51, 61, 63, 118, 119; 380/3; 345/302; 348/6, 7, 9, 12, 13, 478, 571, 688; 370/527, 528; 360/32, 33.01, 49, 70, 77.01; 369/2, 47, 48, 178, 192

[56] References Cited

U.S. PATENT DOCUMENTS

| | | | |
|---|---|---|---|
| 5,408,686 | 4/1995 | Mankovitz | 455/66 |
| 5,464,946 | 11/1995 | Lewis | 84/609 |
| 5,613,192 | 3/1997 | Ikami et al. | 455/4.2 |
| 5,613,909 | 3/1997 | Stelovsky | 463/1 |
| 5,616,876 | 4/1997 | Cluts | 434/307 A X |
| 5,621,182 | 4/1997 | Matsumoto | 84/610 |
| 5,663,516 | 9/1997 | Kawashima | 84/610 |
| 5,691,494 | 11/1997 | Sai et al. | 434/307 A X |
| 5,768,396 | 6/1998 | Sone | 381/61 |
| 5,773,743 | 6/1998 | Ogawa et al. | 84/610 |
| 5,797,752 | 8/1998 | Umezawa | 434/307 A |
| 5,824,935 | 10/1998 | Tanaka | 84/631 |
| 5,827,990 | 10/1998 | Fujita | 84/610 |
| 5,852,800 | 12/1998 | Modeste et al. | 704/211 |
| 5,857,171 | 1/1999 | Kageyama et al. | 704/268 |
| 5,900,566 | 5/1999 | Mino et al. | 84/610 |

*Primary Examiner*—Joe H. Cheng
*Attorney, Agent, or Firm*—Barnes & Thornburg

[57] ABSTRACT

A karaoke system for providing improved services with customers, utilizing inherent network resources of a large-scale communication karaoke system is disclosed.

The karaoke system according to one aspect of the present invention has a host apparatus 2 and a plurality of remote terminal apparatuses 1 for playing karaoke music communicating with the host apparatus via a communication network 3. Each of the remote terminal apparatuses 1 stores karaoke data transferred from the host apparatus 2 and plays the karaoke data selected from among the stored karaoke data by a speaker 11 and a CRT display 15.

The host apparatus 2 stores a plurality of records of customers of the karaoke system.

Each of the remote terminal apparatuses 1 comprises a central processing unit 4 for identifying a customer to acquire an identifier of the customer, acquiring the corresponding customer record from the host apparatus, updating the acquired customer record according to the customer's using status of the karaoke system, generating messages for the customer based on the acquired customer record, outputting the generated messages to the customer, and uploading the updated customer record to the host apparatus to update the corresponding customer record stored in the host apparatus.

15 Claims, 3 Drawing Sheets

INDIVIDUAL CUSTOMER RECORD

EXEMPLARY MESSAGE TEMPLATE
FOR
HOBBY GROUP

KARAOKE SYSTEM HAVING HOST APPARATUS WITH CUSTOMER RECORDS

BACKGROUND OF THE INVENTION

1. Field of the Invention

The present invention relates to a karaoke system consisting of a host apparatus and a plurality of remote terminal apparatuses connected thereto via a communication network, specifically relates to a karaoke system providing new services to the customers utilizing network technologies.

2. Description of the Related Art

One of prevalent karaoke systems includes a host apparatus and a plurality of remote terminal apparatuses connected thereto via a communication network. This type of karaoke system is generally referred to as a "communication karaoke system". In the communication karaoke system, each of the remote terminal apparatuses stores karaoke data transmitted from the host apparatus. The stored karaoke data in the remote terminal apparatus is able to be played on demand. When a customer chooses a favorite karaoke music piece using such a device as a remote control of the terminal apparatus, the karaoke accompaniment for the selected tune is played by speakers and character strings of the lyrics of the tune is displayed on a CRT display in synchronism with the karaoke music. Timing marks for instructing a singer when to sing are also displayed with the character strings of the lyrics. Moving or still images are superimposed in the background of the displayed lyrics, which may go along with the karaoke music. Various services have been developed and applied to standalone karaoke players as well as the communication karaoke system. However, most of the services are directly related to convenience in singing of customers.

The communication karaoke system is a large-scale computer network including a host computer and a number of remote terminal apparatuses arranged nationwide communicating with the host computer via a communication network, in other words, a multimedia system handling various digital audio and image information, including moving pictures. Advanced functions and new usage using network resources of the communication karaoke system are now being extensively studied and developed.

SUMMARY OF THE INVENTION

It is an object of the present invention to provide a karaoke system providing improved services with customers in which the customers feel like treated by a familiar clerk even in unattended karaoke facilities, utilizing inherent network resources of a large-scale communication karaoke system.

To accomplish the above and other objects, a karaoke system according to one aspect of the present invention has a host apparatus and a plurality of remote terminal apparatuses for playing karaoke music communicating with the host apparatus via a communication network. Each of the remote terminal apparatuses stores karaoke data transferred from the host apparatus and plays the karaoke data selected from among the stored karaoke data. The respective remote terminal apparatuses include audio output means for outputting karaoke sound and video display means for displaying at least lyrics in the karaoke data.

The host apparatus stores a plurality of customer records of the karaoke system.

Each of the remote terminal apparatuses comprises customer identifying means for acquiring an identifier of a customer, customer record acquiring means for downloading a record corresponding to the acquired customer identifier from the host apparatus, customer record updating means for storing the downloaded record and updating the record according to the customer's using status of the karaoke system, message generating means for generating messages for the customer based on the downloaded record, message outputting means for outputting the generated messages to the customer, and customer record uploading means for uploading the updated customer record to the host apparatus to update the corresponding customer record stored in the host apparatus.

According to the above aspect of the present invention, customers of the karaoke system receive services based on the respective customer records as if treated by a familiar clerk to satisfy the customers and distinct the present karaoke system from the conventional systems. Furthermore, every karaoke facility in the same karaoke system is able to provide services of equivalent quality based on the respective centralized customer records.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF PREFERRED EMBODIMENTS

Figure 1:
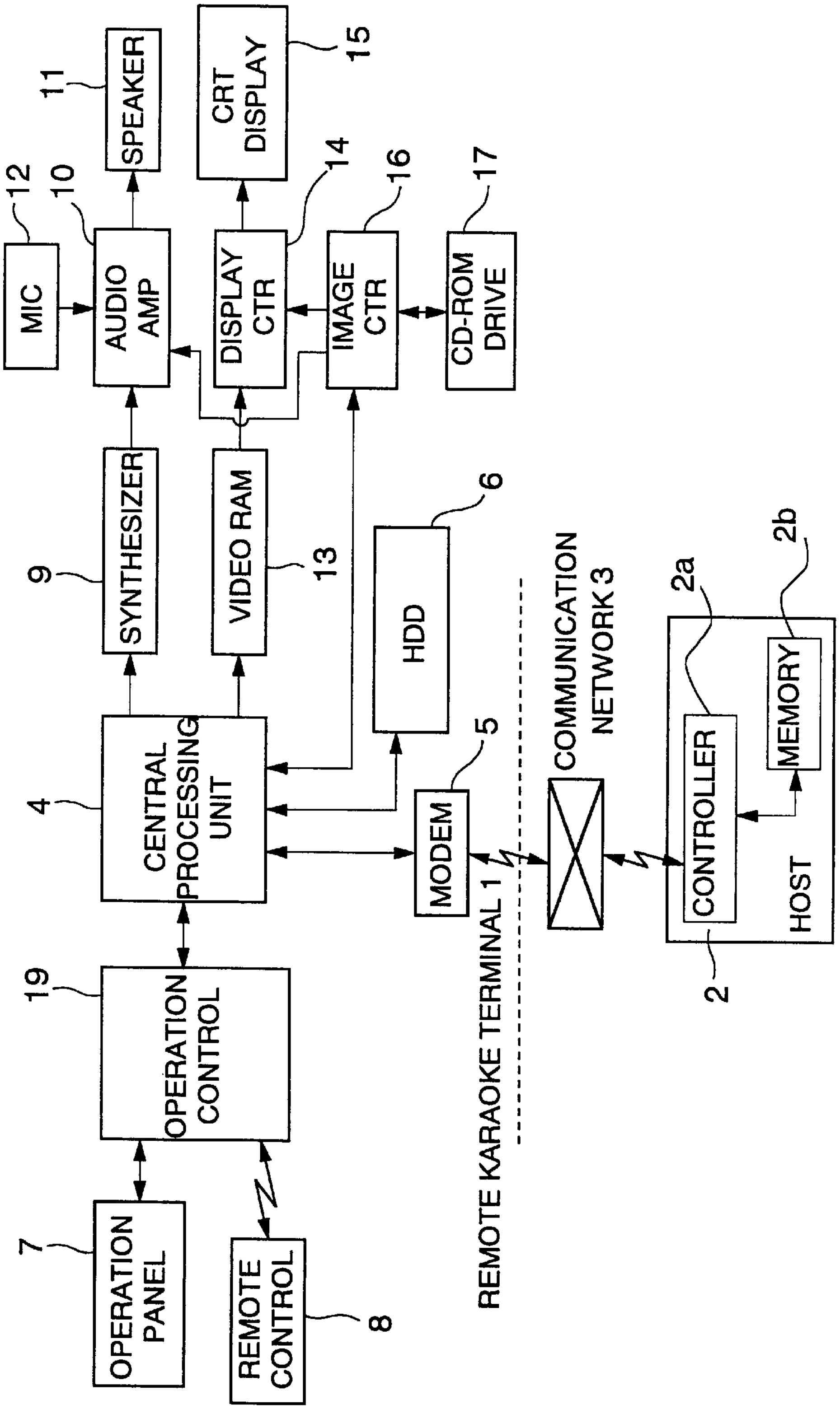
FIG. 1 is a schematic block diagram of a karaoke system according to one embodiment of the present invention.

System configuration of a karaoke system according to one embodiment of the present invention is shown in FIG. 1, featuring a hardware arrangement of a remote karaoke terminal apparatus 1. A plurality of the remote karaoke terminal apparatuses 1 are connected to a host apparatus 2 via a communication network 3. The host apparatus 2 typically includes a fast and high-performance computer. The remote karaoke terminal apparatus 1, as shown in FIG. 1, has a central processing unit 4, which generally includes a microprocessor employed for a typical personal computer.

Construction of the remote karaoke terminal apparatus 1 will be described hereinbelow. The central processing unit 4 is connected to the communication network 3 via a modem 5. Karaoke data is transferred from the host apparatus 2 to the respective remote karaoke terminal apparatuses 1. The karaoke data contains at least karaoke accompaniment musical data in MIDI format and lyrics data with synchronizing information with the accompaniment. A hard disk drive 6 stores a plurality of karaoke data transferred from the host apparatus 2.

A main body of the remote terminal apparatus 1 has an operation panel 7, including a display (not shown) and a keyboard (not shown) for users' operation of the terminal apparatus 1. A remote control 8 is also equipped with the remote karaoke terminal apparatus 1. The operation panel 7 and the remote control 8 communicate with the central processing unit 4 via an operation control portion 19. Karaoke customers are able to conduct various data input operation such as karaoke data selection, using the operation panel 7 of the terminal apparatus 1 or the remote control 8. Response to the operations conducted or the data input by the customer is displayed on the display of the operation panel 7 of the terminal apparatus 1.

The karaoke musical data is reproduced under control of the central processing unit 4 as follows. The karaoke data containing musical data and lyrics data of the selected song are read out from the hard disk drive 6. The musical data in MIDI format is input into a synthesizer 9 in sequence and converted into audio signals. The audio signals of the musical data are output by a speaker 11 via an audio amplifier 10. The amplifier 10 also mixes an output of a microphone 12 with the audio signals of the musical data. On the other hand, in synchronism with the audio output, the central processing unit 4 sequentially converts the lyrics data into character strings and write the converted character data in a video RAM 13. In the meantime, the central processing unit 4 processes the character data to change colors of the characters displayed along with progress of the song so as to instruct the singer the timings of singing. A display control portion 14 displays the stored data in the video RAM 13 on a CRT display 15.

Moving image information including background images are played back by a CD-ROM drive 17. An image control portion 16 having a microcomputer functioning on the commands from the central processing unit 4, selects the image data to be played and reads out the selected data from the CD-ROM drive 17. The selected and read out data which is compressed, is then expanded and forwarded to the display control portion 14. The display control portion 14 superimposes character strings of the lyrics from the video RAM 13 on the image signals from the image control portion 16 to display the processed images on the CRT display 15.

The hard disk drive 6 may be replaced with other memory apparatuses. The CD-ROM drive 17 is also compatible with other image reproducing apparatuses such as a digital video disk (DVD) player. The audiosignals may be read out from the CD-ROM drive 17 or the like and played back by the speaker 11 via the image control portion 16 and the audio amplifier 10. Furthermore, a multichannel television receiver of a satellite broadcasting system may be added to the karaoke system of the present invention. The received images on a certain channel is able to be displayed on the CRT display 15 as background images behind the karaoke lyrics via the image control portion 16 and the display control portion 14. The channel may be selected according to the category of the karaoke song to be played.

<<Customer Record File>>

Figure 2:
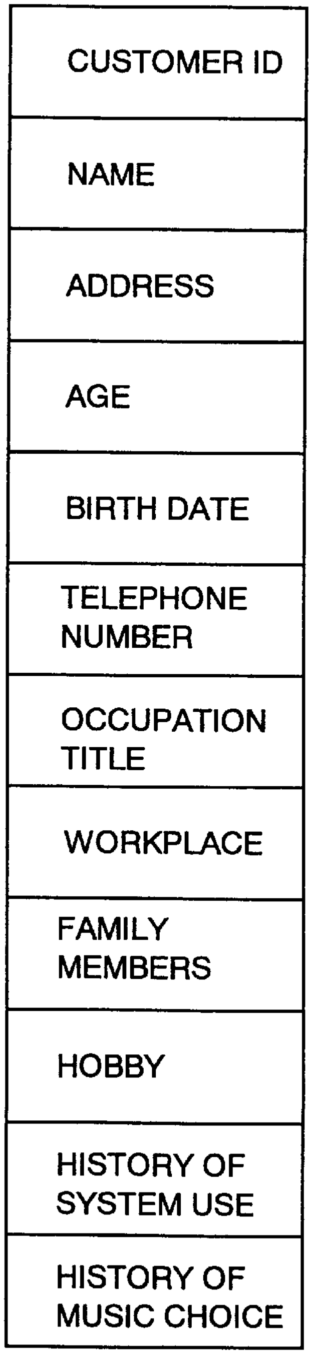
FIG. 2 is an example of a customer record of the karaoke system according to one embodiment of the present invention.

Customer record file is stored in a memory portion 2*b* of the host apparatus 2. A controller 2*a* of the host apparatus 2 supervises the memory portion 2*b* including transmission control of the data in the memory portion 2*b*. The customer record file is an accumulation of customer records, each including information related to an individual customer. FIG. 2 shows an example of an individual customer record format. Customer ID, an identifier for identifying the individual customer, is uniquely provided with the respective customer records. Each record includes basic registration items, history of system use and history of music choice. The basic registration items which are input by the customer themselves on application to the present karaoke system, typically include such customer's information as a name, an address, a date of birth, hobbies, an occupation, a place of work, family members and so on. The history of system use is a record of the individual customer's use of the karaoke facilities employing the present karaoke system, in which time and date of use, and names of the facilities used are listed in time sequence. The history of music choice contains a list of karaoke songs which the customer selected. The list may further include a time sequence record of the selected song names and the time stamps on which the songs requested, a table showing the number of request corresponding to certain songs, favorite singers and favorite kinds of music of the customer, and so on.

The customer record file is managed by the host apparatus 2. When the host apparatus 2 is requested to transfer the customer record from the remote karaoke terminal apparatus 1 by designating the customer ID, the host apparatus 2 sends the requested customer record to the remote terminal apparatus 1 which originated the request. In other words, the remote karaoke terminal apparatus 1 is able to download any customer record contained in the customer record file stored in the host apparatus 2. Contents of the customer records downloaded to the remote terminal apparatus 1 may be updated depending on the conditions such as use of the karaoke system by the customer. If the downloaded record is once updated, the record has some information to be reflected to the corresponding customer record stored in the host apparatus 2. The host apparatus 2 periodically retrieves the updated customer records in the respective remote terminal apparatuses 1 with other information such as function status of the remote terminal apparatuses 1, to update the customer record file in the host apparatus 2. The customer records stored in the remote karaoke terminal apparatus 1 are able to be updated by retrieving the latest information data from the host apparatus 2. In the remote karaoke terminal apparatus 1 of the present embodiment, the functions of identifying a customer, acquiring, updating and uploading the corresponding customer record, and generating and outputting messages to the customer are performed by the central processing unit 4. However, those functions may be achieved by other hardware configurations such as combination of discrete circuit blocks.

<<Retrieval of Customer ID by Remote Karaoke Terminal Apparatus 1>>

The remote control 8 includes two kinds of devices, a remote control equipped with the remote terminal apparatus 1 and a personal remote control which belongs to each customer, specifically to frequent customers. The personal remote control is designed and manufactured such that a unique ID code as a preamble code is included in the output signals such as signal using infrared radiation. When one customer is related to the ID code of the personal remote control of his/her own, the ID code of the personal remote control is considered to be his/her customer ID. Therefore, a customer having a personal remote control selects the song he/she wants to sing at a remote karaoke terminal apparatus 1 in a karaoke facility of the present system, the central processing unit 4 or the operation control portion 19 of the remote terminal apparatus 1 recognizes the customer ID by analyzing the input signal of the remote control 8.

There may be other methods to provide each customer with a unique ID, for example, issuing an ID card bearing such as magnetic record of the customer ID and retrieve the ID by a reader equipped in karaoke facilities.

<<Procedure of Sending Messages to Customers>>

(a) When a customer first uses his/her personal remote control after he/she comes to a karaoke facility, the central processing unit 4 of the karaoke remote terminal apparatus 1 retrieves the customer ID from the signals transmitted from the personal remote control.

(b) The central processing unit 4 determines if a customer record corresponding to the retrieved customer ID is stored in the predetermined memory portion in the remote terminal apparatus 1.

(c) When the corresponding customer ID does not exist in the remote terminal apparatus 1, the central processing unit 4 accesses to the host apparatus 2 via the modem 5 and the communication network 3 so as to download the corresponding customer record from the host apparatus 2 and store the record in the predetermined memory portion in the remote terminal apparatus 1.

(d) Subsequently, the central processing unit 4 examines the contents of the stored customer record to generate messages for the customer who operated the above-mentioned personal remote control according to the contents of the record and the predetermined message generation rules.

(e) The central processing unit 4 then controls the following steps:

(i) The predetermined music data is provided to the synthesizer 9 as a background music along with transmission of the message;

(ii) The character string data of the generated messages are written in the video RAM 13; and (iii) The background image when the massage is transmitted is played back by the CD-ROM player 17 according to the instructions from the image control portion 16 and the image signals are supplied to the display control portion 14.

According to the above steps, while the welcome music to the customer is played by the speaker 11, character string of the generated message to the customer is displayed on the CRT display 15 with the background images such as a welcome moving images.

<<Examples of Messages; Generating Method Therefor>>

For example, the following message template files are stored in the predetermined memory portion of the central processing unit 4.

"Welcome to DK Karaoke Tokyo, NAME, since you visited our Osaka branch on YY MM DD. We hope you will be relaxed and enjoy."

"Is this your business trip to Tokyo? Today we would like you to sing SONG that you sang at our BRANCH branch on YY MM DD."

"We are happy to hear that your elder son has entered an elementary school this spring, NAME."

"Another request for the song SONG will be your 100th request of the same song, NAME. A small present for your 100th request will be presented to you at our reception desk."

The undefined NAME, SONG, BRANCH and YY MM DD portions in the above message templates are filled with the personal information such as a customer's name, a song title, a branch name, and a corresponding date, retrieved from the customer record to generate the messages to the specified customer. One example of the completed message is as follows:

"Welcome to D K Karaoke Tokyo, Mr. John Doe, since you visited our Osaka branch on Feb. 25, 1996. We hope you will be relaxed and enjoy."

<<Variations in Message Generation>>

Figure 3:
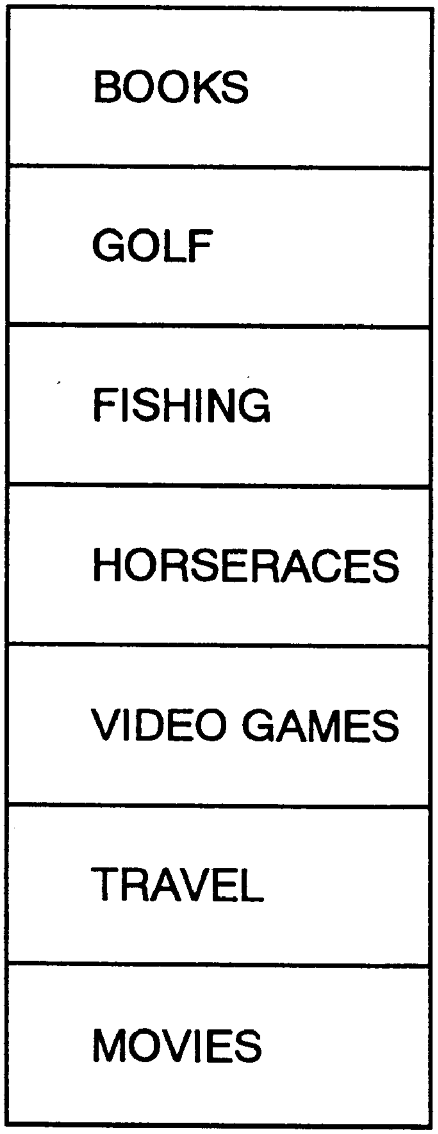
FIG. 3 shows a hobby group in message templates of the karaoke system according to one embodiment of the present invention.

As described above, various message template files are stored in the predetermined memory portion in the central processing unit 4. A set of the stored template files is hereinafter referred to as a "message template set". The message template set is classified into several categories. In the categories is there a "hobby" group. As shown in FIG. 3, the hobby group contains many items such as books, golf, fishing, horseraces, video games, travel, and movies. The message template files are prepared for each of the hobby items.

One example of the message template for the item "movies" reads as follows: "Have you seen the latest movie, "Purple Snow", NAME? The movie gets five stars this week and would be a must for you." In this case, the contents of the template should be updated according to the latest information about the movie scene. The similar templates requiring frequent updates are originated by the host apparatus 2 and transmitted to the respective remote karaoke terminal apparatuses 1 to update the message template set stored in the terminal apparatus 1.

Another example of the message template prepared by the host apparatus 2 to contain the latest information about "fishing" may read as follows: "NAME, the best season for fishing jacks in Tokyo bay begins in June. Our correspondent reports that you may enjoy a large catch, though the size is a bit smaller this year."

Further example of the message template about horseraces may be as follows: "DKboy and Whitehorse won Globe Cup on May 19. Did you win, NAME?"

The above-mentioned karaoke system as an information service system, containing transmission of the message template files prepared by the host apparatus 2 to the remote karaoke terminal apparatuses 1, including the latest information arranges the messages so as to the customers' demand and interest according to the contents of the respective customer records. Those arranged messages seem to be prepared for an individual customer personally. The above personal information service system may be applied to in various fields.

What is claimed is:

1. A karaoke system having a host apparatus and a plurality of remote terminal apparatuses for playing karaoke music communicating with said host apparatus via a communication network, each said remote terminal apparatus storing karaoke data transferred from said host apparatus and playing the karaoke data selected from among said stored karaoke data, each said remote terminal apparatus including audio output means for outputting karaoke sound and video display means for displaying at least lyrics in said karaoke data, wherein said host apparatus stores a plurality of customer records of the karaoke system; and said remote terminal apparatus comprises customer identifying means for acquiring an identifier of a customer, customer record acquiring means for downloading a record corresponding to the acquired customer identifier from the host apparatus, customer record updating means for storing the downloaded record and updating the record according to the customer's using status of the karaoke system, message generating means for generating messages for the customer based on the downloaded record, message outputting means for outputting said generated messages to the customer, and customer record uploading means for uploading the updated customer record to the host apparatus to update the corresponding customer record stored in the host apparatus.

2. A karaoke system claimed in claim 1, wherein said message generating means and said message outputting means of the remote terminal apparatus display visual messages by the video display means.

3. A karaoke system claimed in claim 2, wherein said video display means comprises a CRT display.

4. A karaoke system claimed in claim 1, wherein said message generating means and said message outputting means of the remote terminal apparatus output sound and/or music related to the generated message to the customer.

5. A karaoke system claimed in claim 1, wherein said remote terminal apparatus is able to be operated by a personal remote control of a customer.

6. A karaoke system claimed in claim 5, wherein said customer identifying means recognizes an identifier contained in signals transmitted from said personal remote control of the customer, for requesting karaoke data in the remote terminal apparatus of the karaoke system.

7. A karaoke system claimed in claim 1, wherein said customer identifying means reads the identifier contained in an ID card issued to the respective customers.

8. A karaoke system claimed in claim 1, wherein each said customer record includes information registered by the customer and information retrieved by the system.

9. A karaoke system claimed in claim 8, wherein said information registered by the customer includes a name and a date of birth of the customer.

10. A karaoke system claimed in claim 8, wherein said information retrieved by the system includes history of usage of the system and history of karaoke data request by the customer.

11. A karaoke system claimed in claim 1, wherein said remote terminal apparatus stores a plurality of message templates for generating messages to the customer.

12. A karaoke system claimed in claim 11, wherein said message templates are generated by the host apparatus and transmitted to the respective remote terminal apparatus.

13. A karaoke system claimed in claim 11, wherein said message templates are categorized into a plurality of groups including a hobby group.

14. A karaoke system including a host apparatus, a plurality of remote karaoke terminal apparatuses, and a communication network connecting therebetween, said host apparatus transmitting karaoke sound data to the respective remote karaoke terminal apparatuses via the communication network, storing a plurality of customer record files, each said customer record file having registration information such as a customer's name and date of birth, and information retrieved by the system such as history of usage of the system and history of karaoke music request by the customer, each said remote karaoke terminal apparatus comprising a communicating portion for communicating with the host apparatus to download karaoke song data, a memory portion for storing the downloaded karaoke song data, a control portion for processing video and audio data signals contained said stored karaoke song data, a video display for displaying at least lyrics of the karaoke song data, and at least one speaker for play back sound of the karaoke song data, said remote karaoke terminal apparatus further comprising, customer identifying means for identifying a customer based on the customer's identifier, customer record acquiring means for downloading a record corresponding to the customer's identifier from the host apparatus, customer record updating means for storing the downloaded record and updating the record according to the customer's using status of the karaoke system, customer record uploading means for uploading the downloaded and updated customer record to the host apparatus to update the corresponding customer record stored in the host apparatus, message generating means for generating messages for the customer based on the downloaded customer record, wherein the generated messages are output through the video display and/or the speaker.

15. A terminal apparatus for a karaoke system communicative of a communication network, said terminal apparatus storing karaoke data transferred via said communication network and playing the karaoke data selected from among said stored karaoke data, said terminal apparatus including audio output means for outputting karaoke sound and video display means for displaying at least lyrics in said karaoke data, wherein said terminal apparatus comprises customer identifying means for acquiring an identifier of a customer, customer record acquiring means for downloading a record corresponding to the acquired customer identifier via the communication network, customer record updating means for storing the downloaded record and updating the record according to the customer's using status of the karaoke system, message generating means for generating messages for the customer based on the downloaded record, message outputting means for outputting said generated messages to the customer, and customer record transmitting means for transmitting the updated customer record to the communication network to update the corresponding customer record.

* * * * *